United States Patent

Hanada et al.

[11] Patent Number: 6,026,407
[45] Date of Patent: *Feb. 15, 2000

[54] LANGUAGE DATA STORAGE AND REPRODUCTION APPARATUS

[75] Inventors: Takako Hanada; Kazunori Muraki, both of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/757,869

[22] Filed: Nov. 27, 1996

[30] Foreign Application Priority Data

Nov. 28, 1995 [JP] Japan .................................. 7-309145

[51] Int. Cl.$^7$ .................................................. G06F 17/30
[52] U.S. Cl. .............................. 707/102; 707/2; 704/270
[58] Field of Search ....................... 707/102, 2; 704/270

[56] References Cited

U.S. PATENT DOCUMENTS

| | | | |
|---|---|---|---|
| 5,027,406 | 6/1991 | Roberts et al. | 704/244 |
| 5,136,655 | 8/1992 | Bronson | 704/270 |
| 5,218,668 | 6/1993 | Higgins et al. | 704/200 |
| 5,500,920 | 3/1996 | Kupiec | 704/270 |
| 5,526,407 | 6/1996 | Russell et al. | 379/89 |
| 5,617,423 | 4/1997 | Li et al. | 370/426 |
| 5,664,227 | 9/1997 | Mauldin et al. | 707/516 |
| 5,682,330 | 10/1997 | Seaman et al. | 364/551.01 |
| 5,689,585 | 11/1997 | Bloomberg et al. | 382/229 |
| 5,717,879 | 2/1998 | Moran et al. | 395/339 |
| 5,729,659 | 3/1998 | Potter | 704/270 |
| 5,765,131 | 6/1998 | Stentiford et al. | 704/277 |
| 5,913,188 | 6/1999 | Tzirkel-Hancock | 704/223 |
| 5,960,385 | 9/1999 | Skiena et al. | 704/9 |

FOREIGN PATENT DOCUMENTS

| | | |
|---|---|---|
| 0649144 | 4/1995 | European Pat. Off. . |
| 353379 | 3/1991 | Japan . |
| 3-117283 | 5/1991 | Japan . |

OTHER PUBLICATIONS

"Correlating Audio and Moving–Image Tracks," IBM Technical Disclosure Bulletin, vol. 33, No. 10A, Mar. 1991, p. 295.

Primary Examiner—Wayne Amsbury
Attorney, Agent, or Firm—Sughrue, Mion, Zinn, MacPeak & Seas, PLLC

[57] ABSTRACT

The invention provides a language data storage and reproduction apparatus wherein manual application of a tag is unnecessary and, even if key inputting for retrieval is not accurate, object language data can be reproduced. A tag application section automatically applies to each language data inputted from a language data inputting section a tag representative of a distribution position of the language data in the entire language data, and a data recognition section performs data recognition processing of the individual language data to obtain recognition data. A storage section stores the recognition data together with the language data to which the tags are applied with reference to the tags. If a word or a phrase to be retrieved is inputted, a key retrieval section retrieves recognition data coincident with the word or the phrase from within the storage section. When the tag corresponding to the retrieved recognition data is outputted as a retrieval result, a data extraction section extracts the language data designated by the tag from the storage section. A language data reproduction section reproduces the language data extracted by the data extraction section.

15 Claims, 6 Drawing Sheets

WAVEFORM OF
SPEECH DATA

FIG. 3

APPLICATION OF TIME TAG

FIG. 4

STORAGE OF SPEECH DATA WITH TIME TAG APPLIED

REPRODUCTION BY LOUDSPEAKER

6,026,407

LANGUAGE DATA STORAGE AND REPRODUCTION APPARATUS

BACKGROUND OF THE INVENTION

1. Field of the Invention

This invention relates to a language data storage and reproduction apparatus which stores language data in the form of speech or character data as an electric signal and retrieves and reproduces desired data from among the stored language data.

2. Description of the Related Art

One language data storage and reproduction apparatus of the type mentioned, an image data storage and reproduction apparatus is known and disclosed, for example, in Japanese Patent Laid-Open Application No. Heisei 3-117283. In the image data storage and reproduction apparatus, image data of a high resolution are compressed, and the compressed image data of a high resolution and image data for retrieval of a low resolution corresponding to the image data of a high resolution are stored into a memory with identification numbers (IDs, tags) manually applied thereto. Then, retrieval is performed for the image data for retrieval of a low resolution using an ID as a retrieval key, and pertinent image data for retrieval is displayed in a low resolution to allow contents of it to be confirmed by the user, whereafter the image data of a high resolution having the same ID is decompressed and reproduced.

With the image data storage and reproduction apparatus, however, although reduction in memory capacity and high speed retrieval are anticipated, a desired image cannot be retrieved if an ID is not applied manually. Further, if it is not known in what corresponding relationship IDs and image data are stored, and besides if the corresponding relationship between an ID and image data is not fully established, a desired image of a high resolution cannot be reproduced. Further, compression and decompression processing for image data are required. Furthermore, the image data storage and reproduction apparatus cannot be applied to speech data since image data of a low resolution is used for retrieval.

SUMMARY OF THE INVENTION

It is an object of the present invention to provide a language data storage and reproduction apparatus wherein, when a series of language data in the form of speech or character data are stored and desired language data is retrieved and reproduced from within the storage language data, manual application of a tag is unnecessary. Even if data for retrieval inputted by means of keys are not accurate, object language data can be reproduced, thereby reducing the time and labor of a user required otherwise for checking of, or amendment to, data.

In order to attain the object described above, according to the present invention, there is provided a language data storage and reproduction apparatus, comprising a language data inputting section for inputting a series of language data as an electric signal, a tag application section for automatically applying to each of language data inputted from the language data inputting section a tag representative of a distribution position of the language data in the entire language data, a data recognition section for performing data recognition processing of the individual language data to obtain recognition data, a storage section for storing the recognition data together with the language data to which the tags are applied with reference to the tags, a retrieval key inputting section for inputting a word or a phrase by means of keys, a key retrieval section for retrieving that one of the recognition data which is coincident with the word or the phrase inputted from the retrieval key inputting section from within the storage section and outputting the tag corresponding to the retrieved recognition data as a retrieval result, a data extraction section for referring to the tag of the retrieval result of the key retrieval section to extract the language data designated by the tag from the storage section, and a language data reproduction section for reproducing the language data extracted by the data extraction section.

The language data storage and reproduction apparatus may be constructed such that the key retrieval section outputs, as the retrieval result, a tag representative of a start point and another tag representative of an end point of the recognition data, and the data extraction section extracts the language data delineated by the tags from the storage section.

The language data storage and reproduction apparatus may be constructed such that, where the language data are speech data, the data recognition section produces a plurality of candidates of speech recognition data by speech recognition whereas the storage section stores the plurality of candidates of speech recognition data together with the language data with the tag applied thereto with reference to the tag.

The language data storage and reproduction apparatus may be constructed such that, where the language data are image data, the data recognition section produces a plurality of candidates of character recognition data by character recognition whereas the storage section stores the plurality of candidates of character recognition data together with the language data with the tag applied thereto with reference to the tag.

With the language data storage and reproduction apparatus, even if a user does not manually apply a tag to language data or does not manually perform correction of a result of data recognition to produce a complete electronic text, the user can retrieve data in a desired portion of the language data readily from among the entire language data. Since the user can recognize language data readily only if the user can directly refer to them, even if data with full tags or error-free data are not prepared by a large amount of operation such as manual application of tags by a machine or data amendment, the amount of information which can be referred to and utilized by the user increases remarkably. For example, a desired portion of a tape on which a conference is recorded can be reproduced and listened to.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
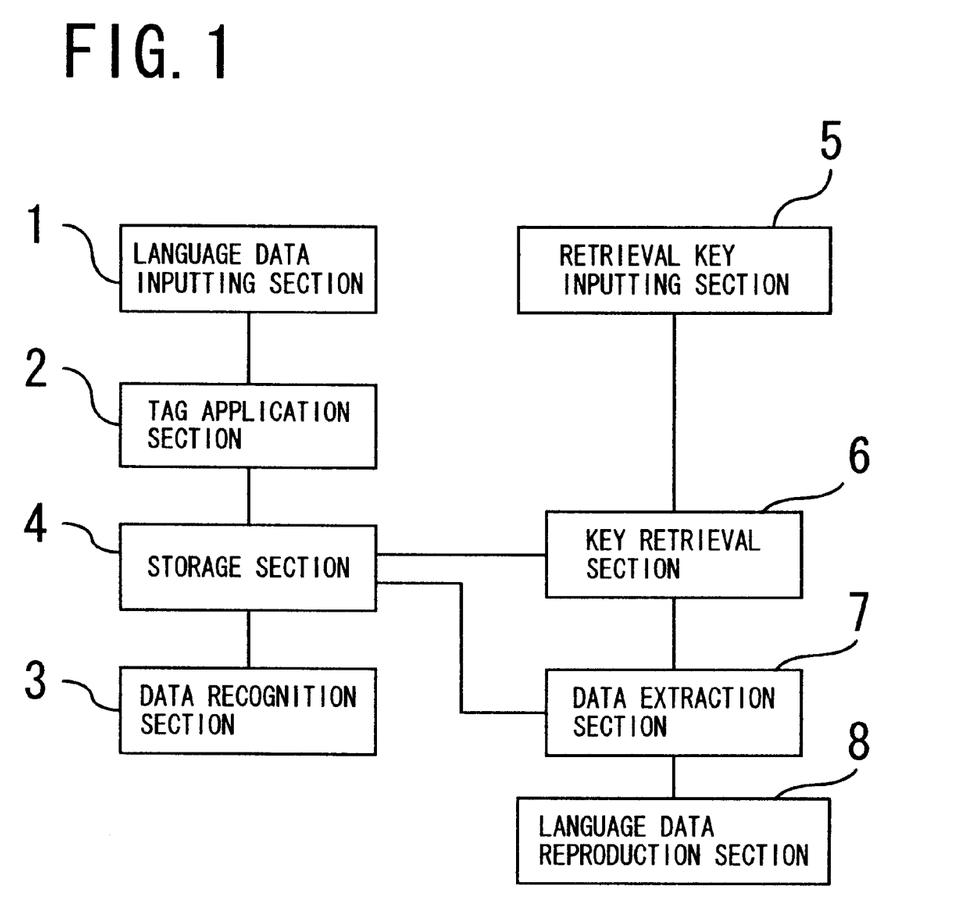
FIG. 1 is a block diagram of a language data storage and reproduction apparatus showing a preferred embodiment of the present invention.

Referring first to FIG. 1, there is shown a language data storage and reproduction apparatus to which the present invention is applied. The language data storage and reproduction apparatus includes: a language data inputting section 1 for inputting a series of language data as an electric signal; a tag application section 2 for automatically applying to each language data inputted from the language data inputting section 1 a tag representative of a distribution position of the language data in the entire series of language data; a data recognition section 3 for performing data recognition processing of the individual language data to obtain recognition data; a storage section 4 for storing the recognition data together with the language data to which the tags are applied with reference to the tags; a retrieval key inputting section 5 for inputting a word or a phrase by means of keys; a key retrieval section 6 for retrieving that one of the recognition data which is coincident with the word or the phrase inputted from the retrieval key inputting section 5 from within the storage section 4 and outputting the tag corresponding to the retrieved recognition data as a retrieval result; a data extraction section 7 for referring to the tag of the retrieval result of the key retrieval section 6 to extract the language data designated by the tag from the storage section 4; and a language data reproduction section 8 for reproducing the language data extracted by the data extraction section 7.

In the language data storage and reproduction apparatus, where the language data to be processed are speech data, the data recognition section 3 produces, for each language data, a plurality of candidates of speech recognition data by speech recognition whereas the storage section 4 stores the plurality of candidates of speech recognition data together with the language data with the tag applied thereto with reference to the tag. For the tag in this instance, the time or the number of vocal sounds from a processing start point of time may be used. On the other hand, where the language data are image data, the data recognition section 3 produces a plurality of candidates of character recognition data by character recognition whereas the storage section 4 stores the plurality of candidates of character recognition data together with the language data with the tag applied thereto with reference to the tag. For the tag in this instance, for example, the position in X and Y directions of a two-dimensional coordinate system may be used.

Figure 2:
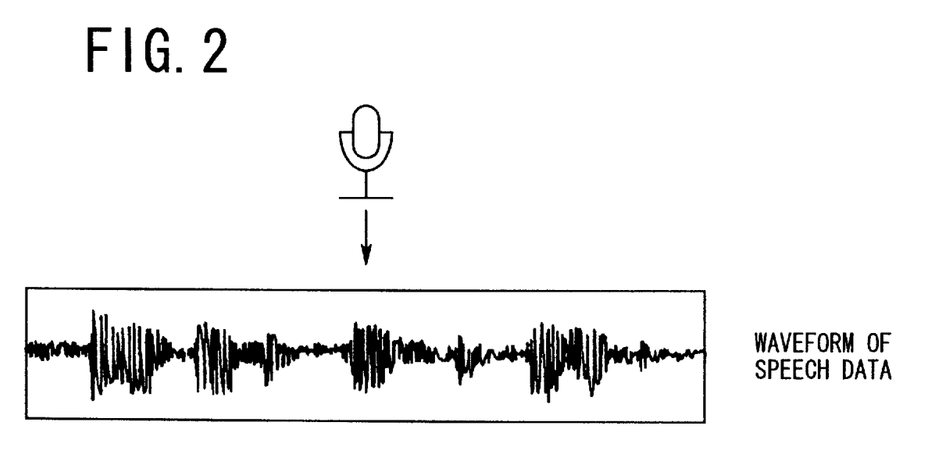
FIG. 2 is a waveform diagram illustrating an example of speech data inputted as an electric signal from a language data inputting section shown in FIG. 1.
Figure 3:
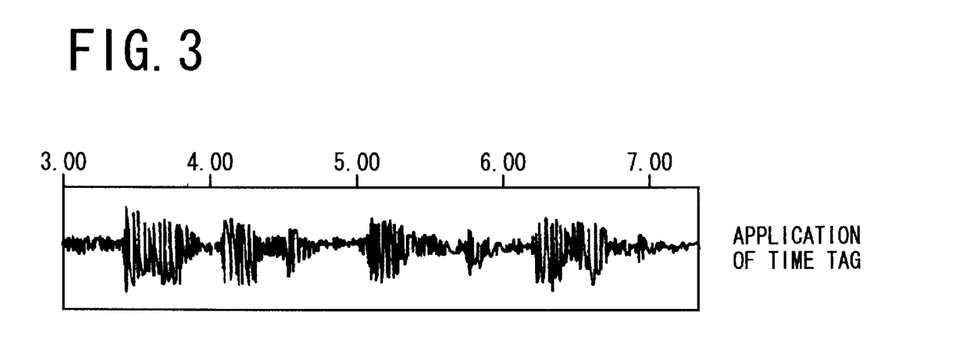
FIG. 3 is a waveform diagram illustrating an application operation of a time tag by a tag application section shown in FIG. 1.
Figure 4:
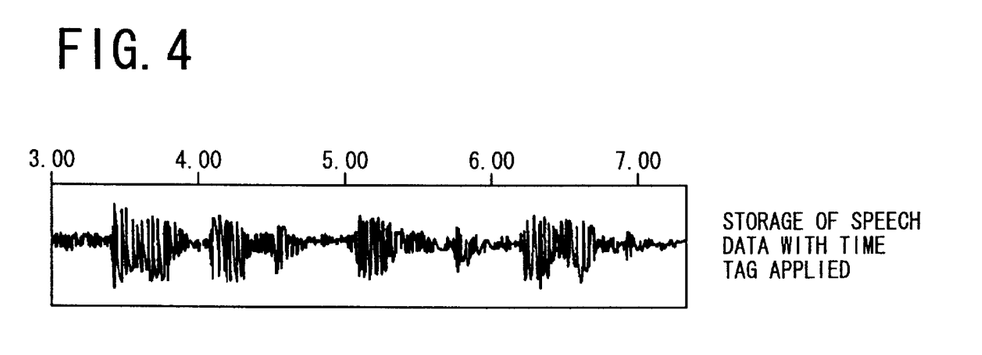
FIG. 4 is a similar view but illustrating storage of speech data to which a time tag is applied into a storage section shown in FIG. 1.

An example of processing where the language data to be processed are speech data will be described. It is assumed that speech data of, for example, "let's meet at three o'clock today" are inputted as an electric signal from the language data inputting section 1 using a microphone. FIG. 2 shows a waveform of the inputted electric signal. The tag application section 2 automatically applies time tags to the inputted speech data as seen in FIG. 3. The speech data with the time tags applied thereto are stored into the storage section 4 with reference to the time tags thereof as seen in FIG. 4.

Figure 5:
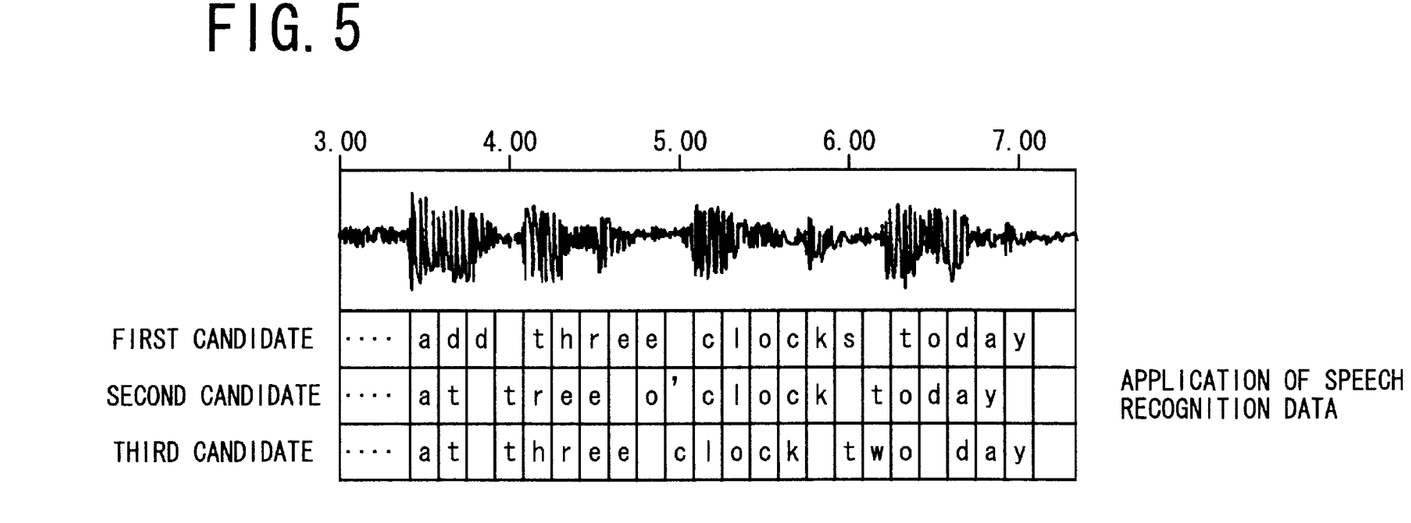
FIG. 5 is a diagrammatic view illustrating storage of recognition data speech recognized by a data recognition section shown in FIG. 1 with reference to time tags into the storage section.

The data recognition section 3 speech recognizes the speech data stored in the storage section 4 to produce a plurality of candidates of speech recognition data. Now, it is assumed that, as a result of speech recognition of the speech data of "at three o'clock today", accurate recognition is not achieved and three candidates of speech recognition data of "add three clocks today", "at tree o'clock today" and "at three clock two day", which are all wrong, are produced. The three candidates of speech recognition data are stored into the storage section 4 with reference to time tags thereof as seen in FIG. 5 in such a manner that they are added to the speech data stored already with the time tags applied thereto. It is assumed now that the three candidates of speech recognition data are stored between the time tags '3.30"' and '7.05 "'.

Figure 6:
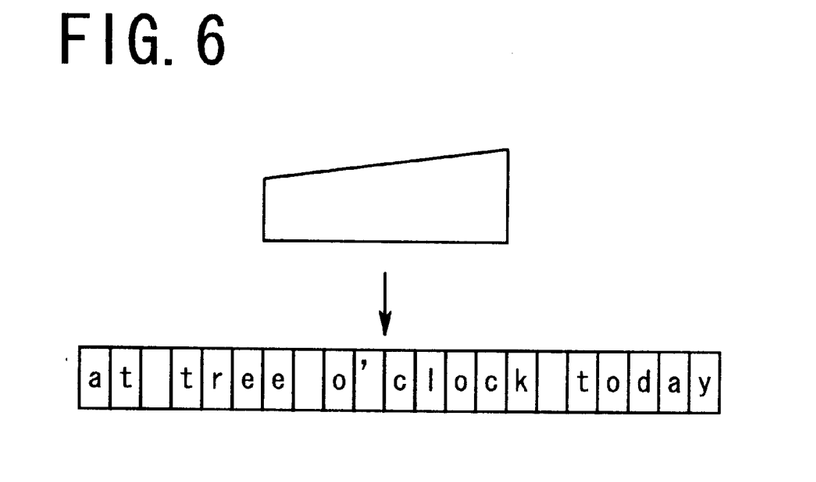
FIG. 6 is a diagrammatic view illustrating data inputted using keys of a retrieval key inputting section shown in FIG. 1.
Figure 7:
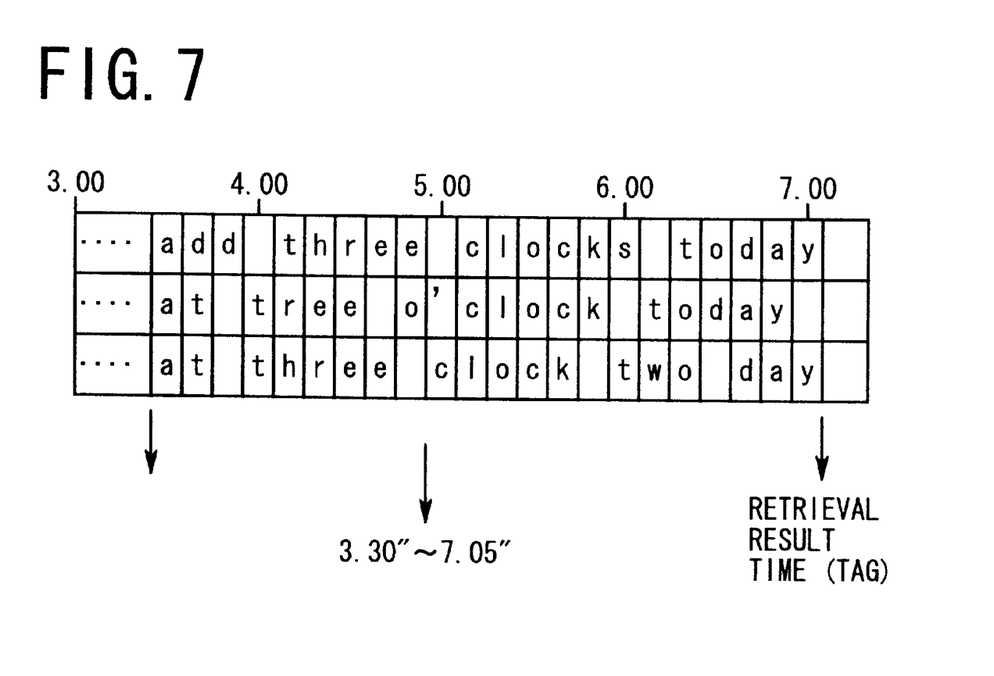
FIG. 7 is a diagrammatic view illustrating a retrieving operation by a key retrieval section shown in FIG. 1.

On the other hand, in order to retrieve and reproduce data of a desired portion of the speech data stored in the storage section 4, a word or a phrase is inputted by means of the keys from the retrieval key inputting section 5. If it is assumed now that "at three o'clock today" is inputted from the retrieval key inputting section 5 as seen in FIG. 6, then the key retrieval section 6 performs retrieval from the speech recognition data stored in the storage section 4 to search out one of the speech recognition data which is highest in conformity with the inputted data and outputs a time tag representative of a start point and another time tag representative of an end point of the searched out speech recognition data as a retrieval result. Since the three candidates of speech recognition data of "add three clocks today", "at tree o'clock today" and "at three clock two day" are stored for the speech data of "at three o'clock today"in the storage section 4 as described above, if speech recognition data which conforms best with "at three o'clock today" other than them is not stored, then the key retrieval section 6 searches out one of the three candidates of speech recognition data of "add three clocks today", "at tree o'clock today" and "at three clock two day" and outputs a time tag '3.30"' representative of a start point and another time tag '7.05"' representative of an end point of the searched out speech recognition data as a retrieval result as seen in FIG. 7.

Figure 8:
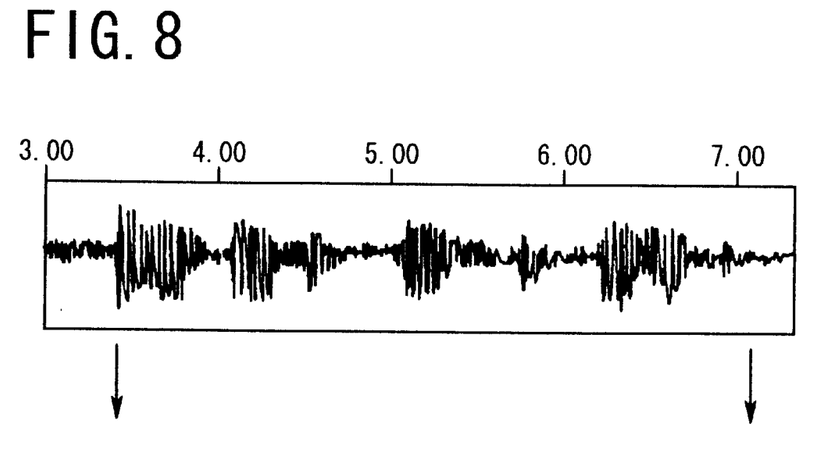
FIG. 8 is a waveform diagram illustrating an extraction operation by a data extraction section shown in FIG. 1.
Figure 9:
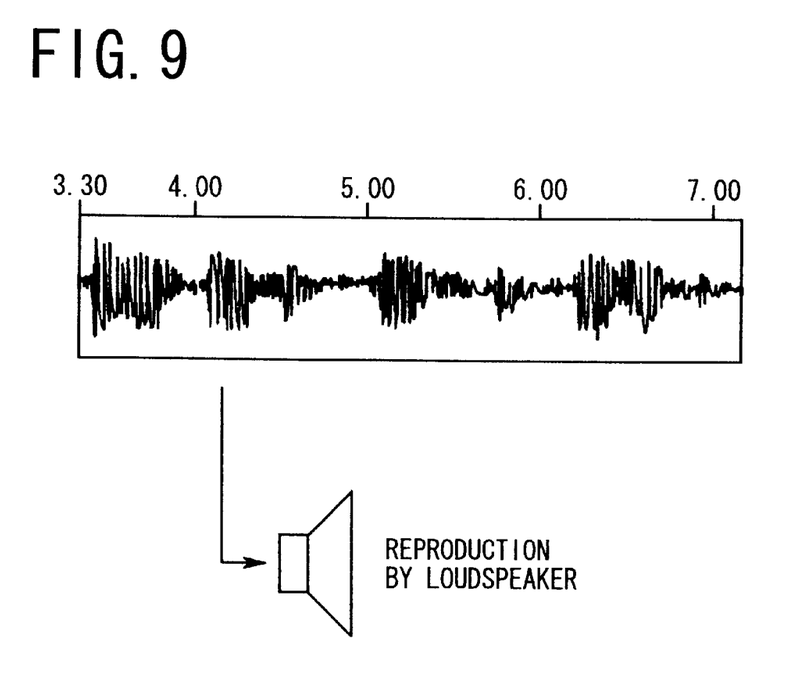
FIG. 9 is a waveform diagram illustrating a reproduction operation by a language data reproduction section shown in FIG. 1.

The data extraction section 7 receives the retrieval result from the key retrieval section 6 and extracts the speech data between the time tags '3.30"' and '7.05"' as seen in FIG. 8 from within the storage section 4. The language data reproduction section 8 reproduces the speech data extracted by the data extraction section 7 using a loudspeaker as seen in FIG. 7. The reproduced speech in this instance is "at three o'clock today", which is the same as the phrase inputted from the retrieval key inputting section 5. It is to be noted that, if necessary, the searched out speech data may be successively reproduced together with data preceding to and following them. In the case of the inputted data described above, "let's meet at three o'clock today" can be reproduced.

Where the language data to be processed are image data, the language data inputting section 1 inputs character data of, for example, a page of a book imaged by a video camera or a like apparatus as an electric signal, and the tag application section 2 automatically applies to the character data position tags of X and Y directions of a two-dimensional coordinate system. The storage section 4 stores the character data with reference to the position tags of them, and the data recognition section 3 performs character recognition of each of the character data stored in the storage section 4 and further performs word recognition in accordance with necessity, and stores a plurality of candidates of character recognition data or a plurality of candidates of word recognition data with reference to the position tags into the storage section 4.

In order to retrieve and reproduce character data from a desired portion of the character data stored in the storage section 4, a word or a phrase is inputted by means of the keys from the retrieval key inputting section 5. The key retrieval section 6 performs retrieval from the series of character recognition data or word recognition data stored in the storage section 4, searches out a series of character recognition data or word recognition data which are highest in conformity with the inputted data, and outputs the position tags of the searched out recognition data as a retrieval result. The data extraction section 7 receives the retrieval result from the key retrieval section 6 and extracts the series of character data designated by the position tags from within the storage section 4. The language data reproduction section 8 displays and reproduces the series of character data extracted by the data extraction section 7 on a display unit.

Having now fully described the invention, it will be apparent to one of ordinary skill in the art that many changes and modifications can be made thereto without departing from the spirit and scope of the invention as set forth herein.

What is claimed is:

1. A language data storage and reproduction apparatus, comprising:

a language data inputting section for inputting a series of language data as an electric signal string;

a tag application section for automatically applying to each of the language data inputted from said language data inputting section a tag representative of a distribution position of the language data in the entire series of language data;

a data recognition section for producing a plurality of recognition data sets, wherein each recognition data set corresponds to a portion of said electric signal string, and each recognition data set contains a plurality of candidates for recognition of said language data, wherein each of the candidates of one recognition data set corresponds to the same portion of said electric signal string as the other candidates in said one recognition data set, and wherein each of the candidates of said one recognition data set is different from any other candidate in said one recognition data set;

a storage section for storing the recognition data sets together with the language data to which the tags are applied with reference to the tags;

a retrieval key inputting section for inputting a word or a phrase by means of keys;

a key retrieval section for retrieving that one of the recognition data sets having a candidate which is coincident with the word or phrase inputted from said retrieval key inputting section from within said storage section and outputting the tag corresponding to the retrieved recognition data set as a retrieval result;

a data extraction section for referring to the tag of the retrieval result of said key retrieval section to extract the language data designated by the tag from said storage section; and a language data reproduction section for reproducing the language data extracted by said data extraction section.

2. A language data storage and reproduction apparatus as claimed in claim 1, wherein said key retrieval section outputs, as the retrieval result, a tag representative of a start point and another tag representative of an end point of the recognition data set, and said data extraction section extracts the language data delineated by the tags from said storage section.

3. A language data storage and reproduction apparatus as claimed in claim 1, wherein the language data are speech data, and said data recognition section produces a plurality of candidates of speech recognition data by speech recognition whereas said storage section stores the plurality of candidates of speech recognition data together with the language data with the tag applied thereto with reference to the tag.

4. A language data storage and reproduction apparatus as claimed in claim 1, wherein the language data are image data, and said data recognition section produces a plurality of candidates of character recognition data by character recognition whereas said storage section stores the plurality of candidates of character recognition data together with the language data with the tag applied thereto with reference to the tag.

5. A language data storage and reproduction apparatus comprising:

a language data inputting section for inputting an electric signal string representative of language data;

a data recognition section for producing a plurality of recognition data sets, wherein each recognition data set corresponds to a portion of said electric signal string, and each recognition data set contains a plurality of candidates for recognizing said language data, wherein each of the candidates of one recognition data set corresponds to the same portion of said electric signal string as the other candidates in said one recognition data set, and wherein each of the candidates of said one recognition data set is different from any other candidate in said one recognition data set;

a storage section for storing each recognition data set together with the corresponding portion of said electric signal string;

an inputting section for inputting a desired word or phrase to be retrieved;

a retrieval section for comparing the desired word or phrase to said plurality of candidates in said recognition data sets, and for retrieving the recognition data set which contains the candidate most closely matched to the desired word or phrase;

a reproduction section for reproducing the segment of language data which corresponds to the recognition data set retrieved by the retrieval section.

6. A language data storage and reproduction apparatus as claimed in claim 5, wherein said electric signal string is a waveform representative of audio data, and said inputting section includes a microphone.

7. A language data storage and reproduction apparatus as claimed in claim 5, wherein said reproduction section includes a speaker.

8. A language data storage and reproduction apparatus as claimed in claim 5, further comprising a tag application section for automatically applying a tag to each portion of said electric signal string, wherein each tag is representative of the position of its corresponding electric signal string portion within the entire electric signal string.

9. A language data storage and reproduction apparatus as claimed in claim 8, wherein said storage section stores each recognition data set together with the corresponding electric signal string portion and associated tag.

10. A language data storage and reproduction apparatus as claimed in claim 8, wherein when said retrieval section retrieves the recognition data set which contains the candidate most closely matched to the desired word or phrase, said retrieval section also retrieves the tag associated with the corresponding electric signal string portion.

11. A language data storage and reproduction apparatus as claimed in claim 10, further comprising an extraction section which extracts from said storage section the electric signal string portion associated with the retrieved tag, for reproduction by said reproduction section.

12. A language data storage and reproduction apparatus as claimed in claim 10, wherein said retrieved tag is representative of the start point and the end point of the retrieved recognition data set as well as the start point and end point of the corresponding electric signal string portion.

13. A language data storage and reproduction apparatus as claimed in claim 8, wherein said electric signal string is representative of image data, and each of said tags applied by said tag application section is representative of the position of the corresponding portion of said electric signal string in a two dimensional coordinate system associated with the entire electric signal string.

14. A language data storage and reproduction apparatus as claimed in claim 5, wherein said electric signal string is representative of image data.

15. A language data storage and reproduction apparatus as claimed in claim 5, wherein said inputting section for inputting a desired word or phrase includes a keyboard.

* * * * *